United States Patent [19]

Kobayashi

[11] Patent Number: 4,910,268

[45] Date of Patent: Mar. 20, 1990

[54] ACRYL TYPE MACROMONOMER HAVING A POLYETHYLENEIMINE DERIVATIVE CHAIN AND PROCESS FOR PRODUCING THE SAME, AS WELL AS GRAFT POLYMER HAVING A POLYETHYLENEIMINE DERIVATIVE CHAIN AS THE GRAFT CHAIN AND PROCESS FOR PRODUCING THE SAME

[76] Inventor: Shiro Kobayashi, 1-1-302, Kawauchi Juutaku, Kawauchi Mubanchi, Sendai-shi Miyagi 980, Japan

[21] Appl. No.: 183,812

[22] Filed: Apr. 20, 1988

[30] Foreign Application Priority Data

Apr. 22, 1987 [JP] Japan ................................ 62-097536
Feb. 29, 1988 [JP] Japan ................................ 63-44205

[51] Int. Cl.$^4$ .............................................. C08G 73/02
[52] U.S. Cl. ..................................... 525/411; 525/412; 525/417; 525/925; 526/304; 526/306
[58] Field of Search ............... 525/411, 412, 417, 925, 525/426; 528/403; 526/304, 306

[56] References Cited

U.S. PATENT DOCUMENTS 3,366,613 1/1968 Kelley ................................ 526/304

FOREIGN PATENT DOCUMENTS 0136844 10/1981 Japan .................................. 525/411

Primary Examiner—Wilbert J. Briggs, Sr.
Attorney, Agent, or Firm—Armstrong, Nikaido, Marmelstein, Kubovcik & Murray

[57] ABSTRACT

An acryl type macromonomer having a polyethyleneimine derivative chain represented by the general formula:

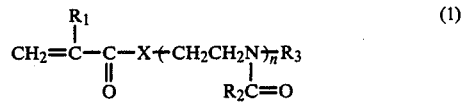

where $R_1$ represents H or $CH_3$, $R_2$ represents H or (substituted) alkyl or aryl group, $R_3$ represents H or (substituted) alkyl group, X represents O or $NR_4$, $R_4$ represents H or alkyl or aryl group and n represents an integer from 1 to 1000, or a graft polymer having the polyethyleneimine derivative chain as a graft chain. The macromonomer can be obtained by reacting the compound of the general formula:

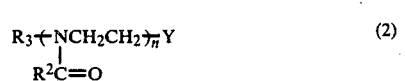

where $R_2$ represents H or (substituted) alkyl or aryl group, $R_3$ represents H or (substituted) alkyl group, Y represents OH or $NHR_4$, $R_4$ represents H or alkyl or aryl group and n represents an integer of 1 to 1000, or the 2-oxazoline compound of the general formula (3):

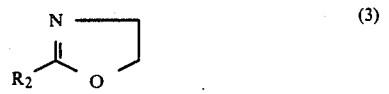

5 Claims, No Drawings

ACRYL TYPE MACROMONOMER HAVING A POLYETHYLENEIMINE DERIVATIVE CHAIN AND PROCESS FOR PRODUCING THE SAME, AS WELL AS GRAFT POLYMER HAVING A POLYETHYLENEIMINE DERIVATIVE CHAIN AS THE GRAFT CHAIN AND PROCESS FOR PRODUCING THE SAME

BACKGROUND OF THE INVENTION

1. Field of the Invention

The present invention concerns polyfunctional polymers which are obtained by copolymerization with various kinds of vinyl monomers such as acryl type and styryl type monomers or by graft polymerization to various kinds of polymers and can be used as non-ionic polymeric surface active agent, surface modifying agent, dispersant, compatibilizing agent, antistatic agent, polymeric dielectric agent, adhesive, binder, material adaptible to living body, etc. as well as novel monomers useful for producing such functional polymers.

2. Description of the Prior Art

It has been known that a poly(N-formylethyleneimine) or poly(N-acylethylimine) can be synthesized by the cationic polymerization of a 2-oxazoline monomer as shown by the following formula (i) (S. Kobayashi et. at., Encyclo. Poly. Sci. & Eng. Vol. 4 2nd Ed., 525 (1986)):

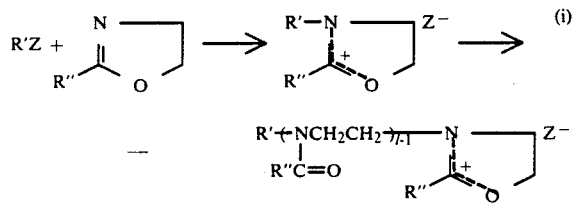

where R' represents H or lower alkyl group, R" represents H or $C_1$-$C_{18}$ alkyl or aryl group, Z represents an electrophilic group such as Br, I and $RSO_3$, R represents a mono-valent organic radical and l represents a positive integer.

Then, it has been known that the living growing end of such a polymer can be deactivated to stop the polymerization as shown by the formulae (ii), (iii) or (iv) respectively by reacting with a nucleophilic reagent such as water, ammonia or primary amine (Kobayashi, et. al. Proceeding of 53th Annual Meeting in Autumn, Chemical Society of Japan, 417 (1986)):

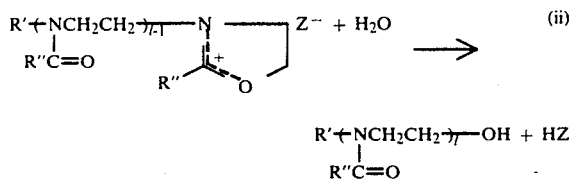

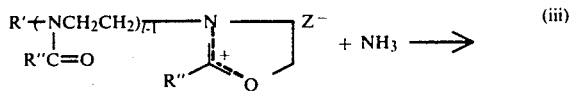

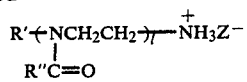

where R', R", Z, and l have the same meanings as those in the formula (i), and

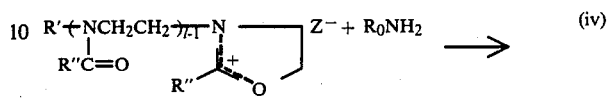

where R', R", Z, and l have the same meanings as in the formula (i), and $R_0$ represents a mono-valent organic group.

Further, for the styryl type macromonomer having such a poly(N-formylethyleneimine) or poly(N-acylethyleneimine) chain, there has been known a method of polymerizing 2-oxazolines by using a styryl type compound, for example, a compound:

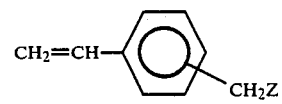

instead of the polymerization initiator R'Z in the formula (i) described above (initiator method) (D. A. Tomalia, et al.; U.S. Pat. No. 4,261,925 (1981), S. Kobayashi, Japan-U.S. Polymer Symposium, 24 (1985)). Further, it has also been known a method of obtaining a product represented by

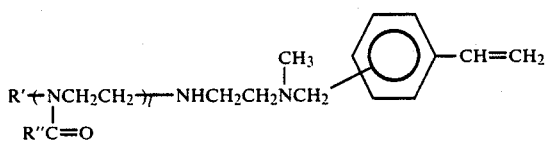

where R', R", and l have the same meanings as in the formula (i) by terminating the living growing cationic end of the poly(N-acylethyleneimine) chain by using a styryl type compound, that is, a compound represented by:

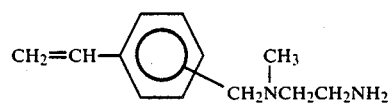

as the terminator $R_0NH_2$ in the formula (iv) described above terminator method (S. Kobayashi, et. al., Polym. Bull. 13 477 (1985)).

While both the initiator method and the terminator method as described above are effective for the synthesis of the styryl type macromonomer, if an acryl type or methacryl type (hereinafter simply referred to collectively as acryl type) compound is used as the polymerization initiator, there is a problem that the growing reaction is slow with the acryl type initiator and the carbon-carbon double bonds of the initiator are gradually decreased during reaction, and it has been impossible to synthesize an acryl type macromonomer having a polyethyleneimine derivative chain.

In view of the above, the present inventor has made a study with an aim of providing an acryl type macromonomer for which polymerization activity different from that of the styryl type can be expected and, as a result, has succeeded in producing an acryl type macromonomer having a novel polyethyleneimine derivative chain.

Further, it has also been succeeded for producing a novel graft polymer having a peculiar functionality and applicable to various application uses by using such a novel macromonomer.

SUMMARY OF THE INVENTION

The acryl type macromonomer having a polyethyleneimine derivative chain as the object of the present invention is represented by the general formula:

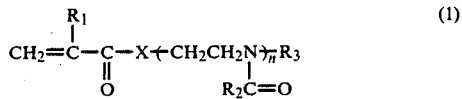   (1)

where $R_1$ represents H or $CH_3$, $R_2$ represents H or (substituted) alkyl or aryl group, $R_3$ represents H or (substituted) alkyl group, X represents O or $NR_4$, $R_4$ represents H or alkyl or aryl group and n represents a number from 1 to 1000, preferably 4.9 to 1000, and the novel monomer represented by the general formula (1) can be produced by reacting a compound represented by the general formula:

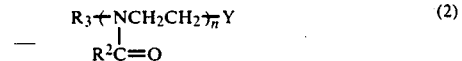   (2)

where $R_2$ represents H or (substituted) alkyl or aryl group, $R_3$ represents H or (substituted) alkyl group, Y represents OH or $NHR_4$, $R_4$ represents H or alkyl or aryl group and n represents a number of 1 to 1000, preferably from 4.9 to 1000, with (metha)acrylic acid or the derivative thereof in the presence of a base. The alkyl group of $R_2$, $R_3$ and $R_4$) means herein ordinarily $C_1-C_{18}$, preferably, $C_1-C_{12}$ alkyl group.

The substituted alkyl group for $R_2$ can include benzyl, alkoxyalkyl, halogenated alkyl, fluorine-containing alkyl, etc., and the substituted alkyl group for $R_3$ can include benzyl, methoxymethyl, etc. Further, the alkyl or aryl group for $R_4$ can include methyl, butyl, benzyl, phenyl, etc.

The compound shown by the formula (2) can be obtained by the living polymerization of a 2-oxazoline compound by using a cationic polymerization initiator such as p-toluene sulfonate, benzenesulfonate, methanesulfonate, trifluoromethanesulfonate, alkyl iodide, alkyl bromide, alkyl chloride, benzyl bromide, benzyl chloride and dimethylsulfate and then reacting the living growing end with a nucleophilic agent such as water, ammonia or a primary amine. In this case, the value for n can be controlled by varying the molar ratio between the 2-oxazoline compound and the initiator. For reacting the living growing end and water, it can be used, for example, a method of heating them under the coexistence of an alkali reagent such as sodium carbonate thereby hydrolyzing the growing end.

The macromonomer according to the present invention of the formula (1) described above can be obtained by reacting the thus obtained compound of the formula (2) with (meth)acrylic acid, a (meth)acrylic acid halide such as acroyl chloride or methacroyl chloride, or a (meth)acrylic acid derivative such as a (meth)acrylic acid ester or (meth)acrylic acid anhydride under the presence of a base such as triethylamine, tributylamine and pyridine at a temperature from $-20°$ C. to $150°$ C. and preferably, from $0°$ C. to $120°$ C.

The acryl type macromonomer represented by the general formula (1) can also be obtained by reacting the living growing end of poly(N-formylethyleneimine) or Poly(N-acrylethyleneimine) represented by the formula (i) formed by the living polymerization of a 2-oxazoline compound represented by the general formula:

   (3)

where $R_2$ represents H or (substituted) alkyl or aryl group, by using a cationic polymerization initiator, directly with a sodium, potassium, silver, copper, calcium or like other metal salt of (meth)acrylic acid, an ammonium or sulfonium salt such as tetramethyl ammonium (meth)acrylate or trimethyl sulfonium (meth)acrylate, a metal ester compound of (meth)acrylic acid and silicon, tin, titanium, etc. at a temperature from $-20°$ C. to $150°$ C., preferably, from $0°$ C. to $120°$ C.

Further, in the present invention, a novel graft polymer having, as the graft chain, a polyethyleneimine derivative chain represented by the general formula:

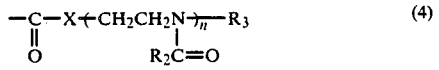   (4)

where $R_2$ represents H or (substituted) alkyl or aryl group, $R_3$ represents H or (substituted) alkyl group, X represents O or $NR_4$, $R_4$ represents H or alkyl or aryl group and n represents an inter from 1 to 1000, by copolymerizing an acryl type macromonomer having such a novel polyethyleneimine derivative chain with a radical or anionic polymerizable monomer.

As the comonomer copolymerizable with the macromonomer shown by the general formula (1) described above upon preparing such a novel graft polymer, there can be used together one or more of monomer, for example, styrenic compounds such as styrene, vinyl toluene and α-methyl styrene; acrylic or methacrylic acid derivatives such as acrylic acid, methacrylic acid, methyl acrylate, ethyl acrylate, propyl acrylate, butyl acrylate, 2-ethylhexyl acrylate, methylmethacrylate, ethylmethacrylate, propylmethacrylate, butylmethacrylate, 2-ethylhexylmethacrylate, hydroxyethyl methacrylate, dimethylaminoethyl methacrylate, diethylaminoethyl methacrylate, acrylonitrile, methacrylonitrile, acrylamide and methacrylamide; ethylenically unsaturated monoolefins such as ethylene, propylene and butylene; diolefin such as butadiene, isoprene and piperylene; vinyl halides such as vinyl chloride, vinylidene chloride, vinyl bromide and vinyl fluoride; vinyl esters such as vinyl acetate and vinyl propionate; vinyl ethers such as methyl vinyl ether and ethyl vinyl ether; vinyl ketones such as vinyl methyl ketone and methyl isopropenyl ketone; nitrogen-containing vinyl compounds such as 2-vinyl pyridine, 4-vinyl pyridine, N-vinyl pyrrolidone; sulfur-containing vinyl compounds such as methylvinyl sulfone; phosphorus-containing compounds such as vinyl phosphonic acid, diethylvinyl phosphonate and vinyl phophonic amide; (monomers, for example). A novel polymer having the polyethyleneimine derivative chain can be synthesized by copolymerizing the macromonomer of the present invention with such a comonomer, or by graft polymerizing the macromonomer to the polymer obtained by the polymerization of such monomers.

For copolymerizing the macromonomer according to the present invention with another comonomer, it is possible to use such a method of using a solvent as required to the mixtures of these monomer, adding a radical polymerization initiator or an anionic polymerization initiator or irradiating light or radioactive rays.

The solvent used in this case is different depending on the structure of the substituent group in the macromonomer of the present invention or depending on the structure of the comonomer as the mating component of the copolymerization. For instance, an appropriate solvent may be selected and used so long as it provides no troubles to the copolymerizing reaction, such as acetonitrile, benzonitrile, nitromethane, toluene, tetrahydrofuran, t-butyl alcohol, and water.

Further, the polymerization initiator for use in the copolymerization include, for example, known radical polymerization initiators, for example, a usual radical generator such as benzoyl peroxide or azoisobutylonitrile and a redox type radical generator such as hydrogen peroxide-iron compound; and organic metal type or other known anionic polymerization initiator such as butyllithium, methylmagnesium bromide, etc.

Although there is no particular restrictions to the polymerization temperature for conducting such polymerization, it is appropriate to conduct the radical polymerization usually at a temperature from 20° to 150° C. and the anionic polymerization usually at a temperature from −78° to 25° C. and, further, light or radiation-irradiated polymerization at a temperature usually from −20° to 50° C.

The acrylic type macromonomer according to the present invention can be copolymerized with various kinds of comonomers to introduce the polyethyleneimine derivative chain into a polymer, thereby enabling to increase the softening point and the glass transition point, etc. of the polymer to improve the thermal property. Further, a novel graft polymer having the polyethyleneimine derivative chain as the graft chain thus obtained is a high molecular compound having special surface activity and is a useful material that can be used for various application uses such as polymeric surface active agent, surface modifying agent, adhesives, etc.

EXAMPLES

The present invention will be described more specifically referring to Examples.

EXAMPLE 1

(1) Preparation of Oxazoline Type Polymer Compound

Under argon atmosphere 6.85 g (80.5 mmol) of 2-methyl-2-oxazoline dissolved in 8 ml of acetonitrile was charged in a glass polymerization tube and maintained at 0° C., to which 0.749 g (4.02 mmol) of methyl p-toluenesulfonate dissolved in 4 ml of acetonitrile was added and mixed well and then reacted at 80° C. for 20 hours while sealing the tube end by welding. After cooling to the room temperature and breaking the seal, the reaction mixture was transferred to a flask. After adding 4.66 g (44 mmol) of sodium carbonate and 2 ml of water and shaken thoroughly, an aqueous phase was fractionated and water was distilled off for drying under a reduced pressure. 40 ml of chloroform was added to the residue, stirred for 12 hours and insoluble parts were removed by suction filtration. Then, chloroform was distilled off under a reduced pressure and then the residue was dried to obtain an end hydroxy type 2-oxazoline polymer compound in a quantitative manner.

The molecular weight of the compound measured by GPC was 1800. Accordingly, it was found that both of $R_2$ and $R_3$ were $CH_3$, Y was OH and n was 21 in the formula (2) above.

(2) Preparation of Macromonomer

In argon atmosphere, 3.4 g of the polymer compound as described above was dissolved in 8 ml of methylene chloride and kept at 0° C., to which 0.48 g of triethylamine (2.4 equivalent amount to the polymer compound) dissolved in 2 ml of methylene chloride was added. Then, 0.37 g of acryloyl chloride (2.0 equivalent amount to the polymer compound) dissolved in 6 ml of methylene chloride was added and further stirred for 24 hours while elevating the temperature of the reaction system to the room temperature. After adding 20 ml of a saturated aqueous solution of sodium hydrogen carbonate to the reaction mixture and stirring for 8 hours, the aqueous layer was fractionated and water was distilled off for drying under a reduced pressure. 40 ml of chloroform was added to the residue, stirred for 12 hours. Then, insoluble matters were separated by suction filtration and dried with anhydrous sodium sulfate, and then chloroform was distilled off under a reduced pressure to obtain 2.2 g of macromonomer (yield: 62%).

$R_1$ was H, both of $R_2$ and $R_3$ were $CH_3$ and X was O in the formula (1) of the macromonomer.

When the molecular weight of the macromonomer was measured by GPC, it showed only one peak and the molecular weight (Mn) was determined to be 1900. The polymerization degree (n) calculated from the result was 21.3.

$^1$H-NMR data ($CDCl_3$, δ value) were as follows:
2.1(br.s., $CH_3C=O$, 63H), 2.9 and 3.0 (s., $CH_3N$,3H)
3.4(br.s., $CH_2N$, 82H), 4.0–4.4(br., $CH_2OC=O$, 2H)
5.7–6.4(br.m., $CH_2=CH$,3H)

From the result, the polymerization degree (n) was calculated as 21.

The IR spectra are as follows:
1630 cm$^{-1}$ ($\nu_{C=O}$, amide), 1720 cm$^{-1}$ ($\nu_{C=O}$, ester)

EXAMPLE 2

A polymer compound was obtained by repeating the producing procedures quite in the similar manner as for the oxazoline polymer compound in Example 1. A macromonomer was obtained at the yield of 81% in the same procedures as those in the subsequent stage of Example 1 except for using 2.0 equivalent amount of methacryloyl chloride instead of acryloyl chloride to the above-mentioned polymer compound.

All of $R_1$, $R_2$, $R_3$ were $CH_3$ and X was O in the formula (1) of the macromonomer.

When the molecular weight of the macromonomer was measured by GPC, only one peak was shown and the molecular weight (Mn) was determined to be 2010. The polymerization degree (n) calculated from the result was 22.4.

$^1$H-NMR data ($CDCl_3$, δ value) were as follows:

1.9(s., CH$_3$C=C, 3H) 2.1(br.s., CH$_3$C=O, 66H), 2.9 and 3.0 (s., CH$_3$N, 3H), 3.4(br.s., CH$_2$N, 86H), 4.0-4.4(br., CH$_2$OC=O, 2H), 5.6 and 6.1(sr., CH$_2$=C, each 3H)

From the result, the polymerization degree (n) was calculated as 22.

The IR spectra are as follows:
1630 cm$^{-1}$ ($\nu$c=o, amide), 1710 cm$^{-1}$ ($\nu$c=o, ester)

EXAMPLE 3

An end hydroxy type polymer compound was obtained at a high yield by the same procedures as those in the preceeding stage of Example 1 except for using unsubstituted 2-oxazoline instead of 2-methyl-2-oxazoline in Example 1.

A macromonomer was produced by the same procedures as those in the subsequent stage of Example 1 except for using 2.0 equivalent amount of methacryloyl chloride instead of acryloyl chloride to the polymer compound. The yield was 70%.

EXAMPLE 4

(1) Preparation of 2-Oxazoline Type Polymer Compound

An end hydroxy type polymer compound was obtained in a substantially quantitative manner by the same procedures as those in Example 1 except for using 2-ethyl-2-oxazoline instead of 2-methyl-2-oxazoline in Example 1.

(2) Preparation of Macromonomer

Reaction was carried out in accordance with the procedures in the preceeding stage in Example 1 for the macromonomer production except for using 2.0 equivalent amount of acryloyl chloride to the polymer compound, to obtain an extracted drying product using an aqueous solution of sodium hydrogen carbonate. Then, the same procedures as those in the subsequent stage of Example 1 were conducted except for repeating extraction for 3 times each with 20 ml of methylene chloride instead of extracting the residue with 40 ml of chloroform, to obtain a macromonomer (yield: 90%).

As the result of the molecular weight measurement by GPC, it was confirmed that the molecular weight (Mn) was 580 and mono-dispersed and the polymerization degree was calculated as 5.0.

EXAMPLES 5-8

Polymer compounds were prepared respectively from the oxazoline type polymer compound in accordance with the method of Example 1 while varying the molar ratio between 2-ethyl-2-oxazoline and methyl p-toluenesulfonate. The respective compounds and acryloyl chloride or methacryloyl chloride were combined and reaction and purification were carried out in accordance with the procedures of Example 4, to obtain macromonomers respectively.

The yield, the measured value for the molecular weight by GPC and the calculation value for the polymerization degree (n) for each of them are shown in Table 1.

The result of the analysis for Example 5 was as below.

$^1$H-NMR(CDCl$_3$, δ value):
1.1(br.t., CH$_3$CH$_2$, 15.6H), 1,9(s., CH$_3$C=, 3H),
2.3(br.q., CH$_2$C=O, 10.4H), 2,9 and 3.0(s., CH$_3$N,3H),
3.4(br.s., CH$_2$N, 19H), 4.2(br.s., CH$_2$OC=O, 2H),
5.6 and 6.0(s., CH$_2$=C, each R1H)

From the result, the polymerization degree n was calculated as n=5.2.

IR spectrum: 1630 cm$^{-1}$ ($\nu$c=o, amide), 1730 cm$^{-1}$ ($\nu$c=o, ester).

EXAMPLE 9

(1) Preparation of Oxazoline Type Polymer Compound

Cationic polymerization was conducted according to the method in the preceeding stage of Example 1 using 2-n-butyl-2-oxazoline. The reaction mixture was transferred to a flask and, after adding 4.66 g (44 mmol) of sodium carbonate and 2 ml of water, reacted and hydrolyzed at 100° C. for 18 hours. 10 ml of water was added and extraction with 10 ml of methylene chloride was repeated for three times to obtain a methylene chloride liquid extract, which was dried with anhydrous sodium sulfate and from which methylene chloride was distilled off under a reduced pressure, to obtain an end hydroxy type 2-oxazoline polymer substantially in a quantitative manner.

The molecular weight of the polymer compound was measured by GPC to obtain a value of 3300. Accordingly, it was found that R$_2$ was n-C$_4$H$_9$, R$_3$ was CH$_3$, Y was OH and n was 26 in the formula (2) of the polymer compound.

(2) Preparation of Macromonomer

To the polymer compound acryloyl chloride (2.0 equivalent to amount the compound) was used, and reaction and purification were carried out in accordance with the procedures as those in the subsequent stage of Example 4 to obtain a macromonomer (72% yield). The measured value for the molecular weight by GPC was 3530 and the polymerization degree (n) was calculated to be 27.1.

EXAMPLE 10

A polymer compound was obtained by repeating the procedures quite in the same manner at the preceeding stage of Example 9. Then, reaction and purification were carried out in the same manner as in the subsequent stage of Example 9 except for using 2.0 equivalent amount of methacryloyl chloride instead of acryloyl chloride, to obtain a macromonomer at the yield of 82 b %.

The measured value for the molecular weight by GPC was 3430 and the polymerization degree (n) was calculated as 26.2.

EXAMPLE 11

A polymer compound was obtained in a good yield in the same procedures as those in the preceeding stage of Example 9 except for using 2-phenyl-2-oxazoline instead of 2-butyl-2-oxazoline in Example 9 and using ethyl p-toluenesulfonate as the polymerization initiator.

A macromonomer was obtained by the reaction and purification in the same procedures as those in the subsequent stage of Example 9 using acryloyl chloride to the polymer compound (yield 85%).

The measured value for the molecular weight by GPC was 2500 and the polymerization degree (n) was calculated as 16.3.

TABLE 1

| Example | R$_1$ | R$_2$ | R$_3$ | Molecular* weight* | n | Synthesis** yield** (%) |
|---|---|---|---|---|---|---|
| 1 | H | CH$_3$ | CH$_3$ | 1900 | 21.3 | 62 |
| 2 | CH$_3$ | CH$_3$ | CH$_3$ | 2010 | 22.4 | 81 |

TABLE 1-continued

| Example | $R_1$ | $R_2$ | $R_3$ | Molecular* weight* | n | Synthesis** yield** (%) |
|---|---|---|---|---|---|---|
| 3 | $CH_3$ | H | $CH_3$ | 730 | 8.9 | 70 |
| 4 | H | $C_2H_5$ | $CH_3$ | 580 | 5.0 | 90 |
| 5 | $CH_3$ | $C_2H_5$ | $CH_3$ | 590 | 4.9 | 92 |
| 6 | H | $C_2H_5$ | $CH_3$ | 2110 | 20.4 | 91 |
| 7 | $CH_3$ | $C_2H_5$ | $CH_3$ | 2180 | 21.1 | 84 |
| 8 | $CH_3$ | $C_2H_5$ | $CH_3$ | 5100 | 50.5 | 80 |
| 9 | H | $n-C_4H_9$ | $CH_3$ | 3520 | 27.1 | 72 |
| 10 | $CH_3$ | $n-C_4H_9$ | $CH_3$ | 3430 | 26.2 | 82 |
| 11 | H | $C_6H_5$ | $C_2H_5$ | 2500 | 16.3 | 85 |

*Molecular weight (Mn) measured by GPC.
**Yield of the macromonomer based on the polymer compound.

EXAMPLE 12

(1) Preparation of Oxazoline Type Polymer Compound

In an argon atmosphere, 1.76 g (17.8 mmol) of 2-ethyl-2-oxazoline dissolved in 5 ml of acetonitrile was charged in a polymerizing tube made of glass and maintained at 0° C., to which 0.63 g (3.4 mmol) of methyl p-toluenesulfonate dissolved in 1 ml of acetonitrile was added, mixed well and reacted at 80° C. for 20 hours while sealing the tube by welding. After cooling to the room temperature and breaking the sealing, the temperature was lowered to 0° C. and 4 ml of a saturated acetonitrile solution in ammonia (ammonia concentration=1.2 mmol/l) was added and reacted at 0° C. for 4 hours. Then, the solvent, etc. were distilled off under a reduced pressure and dried to obtain an end primary ammonium salt type 2-oxazoline polymer compound in a quantitative manner. p-Toluenesulfonic acid ions are bonded to the end of the polymer compound.

(2) Preparation of Macromonomer

To 2.3 g of the polymer compound described above dissolved in 13 ml of methylene chloride, 1.20 g (4.0 equivalent amount to the polymer compound) of triethylamine dissolved in 2 ml of methylene chloride was added at 0° C. in an argon atmosphere. Then, 0.751 g of acryloyl chloride (3.0 equivalent amount to the polymer compound) dissolved in 3 ml of methylene chloride was added and stirred for 24 hours while elevating the temperature of the reaction system to the room temperature. 20 ml of an aqueous solution of saturated sodium hydrogen carbonate was added to the reaction mixture and stirred for 4 hours. Further, extraction was repeated for three times each time with 10 ml of methylene chloride and extracted solutions were collected. The extracts were dried with anhydrous sodium sulfate, and methylene chloride was distilled off under a reduced pressure to obtain a macromonomer at the yield of 70%.

$R_1$ was H, $R_2$ was $C_2H_5$, $R_3$ was $CH_3$ and X was NH in the formula (1) of the macromonomer. The measured value for the molecular weight by GPC was 570 and the polymerization degree (n) calculated therefrom was 4.9.

EXAMPLE 13

A polymer compound was obtained quite in the same procedures as those in the preceeding stage of Example 12. Then, the same procedures as those in the subsequent stage of Example 12 were carried out except for using methacryloyl chloride instead of acryloyl chloride to obtain a macromonomer at the yield of 65%.

$R_1$ was $CH_3$, $R_2$ was $C_2H_5$, $R_3$ was $CH_3$ and X was NH in the formula (1) of the macromonomer. The polymerization degree (n) based on the GPC measurement and calculation was 6.0.

EXAMPLE 14

A polymer compound was obtained in the same procedures as those in the former stage of Example 12 except for using 2-n-butyl-2-oxazoline instead of 2-ethyl-2-oxazoline. Then, a macromonomer was obtained at the yield of 78% by substantially the same procedures as those in the latter stage of Example 12.

$R_1$ was H, $R_2$ was $n-C_4H_9$, $R_3$ was $CH_3$ and X was NH in the formula (1) above of the macromonomer, and the polymerization degree (n) was 12.0.

EXAMPLE 15

A polymer compound was obtained in the same procedures as those in the former stage of Example 12 except for using n-propylamine instead of ammonia as the polymerization terminator. Successively, a macromonomer was obtained at the yield of 75% by conducting substantially the same procedures as those in the latter stage of Example 12.

$R_1$ was H, $R_2$ was $C_2H_5$, $R_3$ was $CH_3$ and X was $N(n-C_3H_7)$ in the formula (1) above of the macromonomer, and the polymerization degree (n) was 9.5.

EXAMPLE 16

In a polymerization tube made of glass and placed in an argon atmosphere, 7.209 g (84.70 mmol) of 2-methyl-2-oxazoline dissolved in 8 ml of acetonitrile was charged and kept at 0° C., to which 3.134 g (16.83 mmol) of methyl p-toluenesulfonate dissolved in 16 ml of acetonitrile was added, mixed well and then reacted at 80° C. for 20 hours while sealing the tube end by welding to obtain a reaction solution (I). The reaction extent of 2-methyl-2-oxazoline at this instance was 100%. Then, 0.197 g (1.021 mmol) of silver methacrylate was added to 4 ml of well-dried acetonitrile in an argon atmosphere under the light-shielded condition and then the reaction solution (I) containing 0.5 equivalent amount of the polymer to the silver methacrylate was added and stirred at 60° C. for 6 hours. After filtrating the solution and removing the precipitates, the product was precipitated in diethyl ether. Then after removing supernatants, the product was dried under a reduced pressure to obtain a white macromonomer at the yield of 72%.

In the macromonomer, all of $R_1$, $R_2$ and $R_3$ were $CH_3$ in the formula (1) above.

When the molecular weight was measured by GPC for the macromonomer, only one peak was shown and the molecular weight was determined to be 700. $^1$H-NMR and IR were the same as those of the macromonomer in Example 2.

EXAMPLE 17

A macromonomer was obtained at the yield of 78% in the same manner as in Example 16 except for using silver acrylate instead of silver methacrylate in Example 16.

$R_1$ was H, $R_2$ and $R_3$ were $CH_3$ in the formula (1) above of the macromonomer.

The molecular weight (Mn) of the macromonomer measured by GPC was 900 and $^1$H—NMR and IR were the same as those of the macromonomer of the Example 1.

EXAMPLE 18

A macromonomer was obtained at the yield of 80% in the same procedures as those in Example 16 except for using sodium methacrylate instead of silver methacrylate and changing the stirring time after adding the reaction solution (I) to 30 hours in Example 16.

All of $R_1$, $R_2$ and $R_3$ were $CH_3$ in the formula (1) above of the macromonomer.

When the molecular weight was measured by GPC for the macromonomer, only one peak was shown and the molecular weight (Mn) was determined to be 700. $^1H$—NMR and IR were the same as those of the macromonomer in Example 2.

EXAMPLE 19

A macromonomer was obtained at the yield of 76% in the same procedures as those in Example 16 except for using potassium methacrylate instead of silver methacrylate and changing the stirring time after adding the reaction solution (I) to 30 hours in Example 16.

All of $R_1$, $R_2$ and $R_3$ were $CH_3$ in the formula (1) above of the macromonomer.

When the molecular weight was measured by GPC for the macromonomer, only one peak was shown and the molecular weight (Mn) was determined to be 690. $^1H$—NMR and IR were the same as those of the macromonomer in Example 2.

EXAMPLE 20

A macromonomer was obtained at the yield of 61% in the same procedures as those in Example 16 except for using tetramethylammonium methacrylate instead of silver methacrylate and changing the stirring time after adding the reaction solution (I) to 30 hours in Example 16.

All of $R_1$, $R_2$ and $R_3$ were $CH_3$ in the formula (1) above of the macromonomer.

When the molecular weight was measured by GPC for the macromonomer, only one peak was shown and the molecular weight (Mn) was determined to be 700. $^1H$—NMR and IR were the same as those of the macromonomer in Example 2.

EXAMPLE 21

A macromonomer was obtained at the yield of 65% in the same procedures as those in Example 16 except for using trimethyl silyl methacrylate instead of silver methacrylate and changing the stirring time after adding the reaction solution (I) to 96 hours in Example 16.

All of $R_1$, $R_2$ and $R_3$ were $CH_3$ in the formula (1) above of the macromonomer.

When the molecular weight was measured by GPC for the macromonomer, only one peak was shown and the molecular weight (Mn) was determined to be 850. $^1H$—NMR and IR were the same as those of the macromonomer in Example 2.

EXAMPLE 22

A macromonomer was obtained at the yield of 67% in the same procedures as those in Example 16 except for using 2-ethyl-2-oxazoline instead of 2-methyl-2-oxazoline and trimethylsilyl methacrylate instead of silver methacrylate in Example 16.

$R_1$ and $R_3$ were $CH_3$ and $R_2$ was $CH_2CH_3$ in the formula (1) above of the macromonomer.

The molecular weight (Mn) measured by the GPC of the macromonomer was 880 and $^1H$—NMR and IR were the same as those of the macromonomer in Example 5.

EXAMPLE 23

In an argon atmosphere, 0.095 g (0.05 mmol) of the acryl type macromonomer obtained in Example 1 and 0.249 g (2.39 mmol) of styrene were charged in a polymerization tube, to which 1.0 ml of t-butyl alcohol and 0.017 g (0.10 mmol) of azobisisobutyronitrile (AIBN) were added and reacted by heating at 80° C. for 5 hours while sealing the polymerization tube using a rubber baloon filled with argon. After the reaction, the reaction solution was cooled to the room temperature, and dropped into diethyl ether with addition of a small amount of chloroform to re-precipitate the product. Then, the polymer was isolated by suction filtration using a glass filter and dried under a reduced pressure at the room temperature to obtain 0.217 g of a white solid copolymer (63% yield based on the total amount of the charged monomers).

In this case since, it was confirmed that all of vinyl groups in the macromonomer and styrene were consumed from the $^1H$—NMR data measured just after the completion of the reaction, it was considered that the loss of the yield was caused in the course of the purifying of the polymer through the re-precipitation although the polymerization reaction was completed to 100%.

When the resultant copolymer was analyzed by GPC using chloroform as solvent, a molecular weight distribution curve having one broad peak was obtained to find that a homopolymer only consisting of the macromonomer was not present. The molecular weight (Mn) was 14,000.

$^1H$—NMR data (CDCl$_3$, δ value) were as follows:
0.7–2.5 (br. signals,
  $CCH_2C + CCHC + CH_3C=0 + CH_3C$, total 216H)
2.9 and 3.0 (s., $CH_3N$, 3H), 3.4 (br.s., $CH_2N$, 88H)
6.0–7.2 (br., $C_6H_5$, 225H)

(While a singlet was observed at the ⊕ value 1.1 other than the signals described above, it indicates the presence of the methyl group derived from AIBN fragment and the signals were out of consideration here and hereafter).

The ratio between $CH_2N$ and $C_6H_5$ was determined based on the analysis value and the copolymer composition ratio between the macromonomer and the styrene was calculated to be 1:44 (charging ratio was 1:48).

The IR spectral data of the resultant copolymer were as below: 1630 cm$^{-1}$ ($\nu c=o$, amide), 1720 cm$^{-1}$ ($\nu c=o$, ester)

When the polymer obtained in this example was dissolved in $C_6D_6$ and $^1H$—NMR was measured for the solution, it was only observed for broad signals assignable to $CH_2CH$ ranging from δ 1.0 to δ 2.5 and signals assignable to phenyl group from δ 6.3 to δ 7.2. They are the signals derived from styrene and no signals derived from the macromonomer were not observed at all. While on the other hand, when dissolved in $D_2O$, the copolymer formed a milk-colored liquid suspension and it was only observed, $^1H$—NMR, a broad signal assignable to $CH_3C=0$ at the δ value of 2.1 and a broad signal assignable to $CH_2N$ around the δ value of 3.5.

From the above measurement, it can be seen that the copolymer of this example formed micells comprising oleophilic styrene portion situated to the outside in $C_6D_6$, while formed micells comprising hydrophilic N-acetylethyleneimine chain situated to the outside in $D_2O$ and it can be utilized as a polymeric surface active agent.

EXAMPLE 24

Copolymerizing reaction was carried out in the similar manner as in Example 23 except for using 0.192 g (0.10 mmol) of the acryl type macromonomer obtained in Example 1 and 0.411 g (4.1 mmol) of methyl methacrylate and adding 1.0 ml of acetonitrile instead of t-butyl alcohol as the solvent. The reaction was completed in 2 hours and, by the same treatment as in Example 23, 0.410 g (68% yield based on the total amount of the charged monomers) of a white solid copolymer.

When the resultant copolymer was analyzed by GPC in the same manner, a molecular weight distribution curve having one broad peak was obtained. The molecular weight (Mn) was 13,000.

$^1$H—NMR data (CDCl$_3$, δ value) were as follows:
0.7–2.6(br.signals, CH$_3$C+CCHC+CH$_3$C=O, total 269H)
2.9 and 3.0(s., CH$_3$N, 3H), 3.4(br.s., CH$_2$N, 88H), 3.6(s., CH$_3$O, 120H)

When the ratio between CH$_2$N and CH$_3$O was determined based on the analytical values and the copolymer composition ratio between the macromonomer and methyl methacrylate was calculated it was 1:39 (charging ratio was 1:41).

IR spectral data were as follows: 1630 cm$^{-1}$ (νc=o, amide), 1720 cm$^{-1}$ (νc=o, ester)

1.2 mg of the copolymer obtained in this example and 100.9 mg of poly(methylmethacrylate) with the molecular weight of 14,000 were dissolved in 1.9 ml of chloroform, cast on a glass plate and then gradually dried at a room temperature for 36 hours to obtain a cast film. Water droplets were fallen to the film with the N-acetylethyleneimine chain content of 0.31% by weight on the glass side of the film and on the air side of the film and the contact angle water was measured by using a contact angle measuring device manufactured by Kyowa Kaimen Kagaku Co. The mean value obtained by the measurement for each 30 times was 74° for the angle of contact on the air side, whereas the contact angle was 51° on the glass side.

In view of the above, it is found that a hydrophilic N-acetylethyleneimine graft chain is localized on the glass side of the film having a large surface free energy during the film formation and, as a result, the water wettability is increased.

EXAMPLE 25

Copolymerizing reaction was carried out in the similar manner as in Example 23 except for using 0.203 g (0.10 mmol) of the acryl type macromonomer obtained in Example 2 and 0.482 g (4.81 mmol) of methyl methacrylate, adding 1.0 ml of acetonitrile instead of t-butyl alcohol as the solvent and increasing the amount of AIBN to 0.035 g (0.21 mmol). The reaction was completed in 2 hours and, after the same treatment as in Example 23, 0.507 g (74% yield based on the charged amount) of a white solid copolymer was obtained.

As the result of the GPC analysis of the resultant copolymer, a molecular weight distribution curve having one peak was shown and the molecular weight (Mn) was 15,000.

$^1$H—NMR data (CDCl$_3$, δ value) were as follows:
0.7–2.6(br., CH$_3$C, 147H, br., CCH$_2$/c, 98H, s., CH$_3$C=O, 66H, total 311H), 3.0(s., CH$_3$N, 3H), 3.4(br.s., CH$_2$N, 88H)
3.6(s., CH$_3$O,144H)

When the ratio between CH$_2$N and CH$_3$O was determined based on the analytical values and the copolymer composition ratio between the macromonomer and methyl methacrylate was calculated, it was 1:49 (the charged ratio was 1:48).

IR spectral data were as follows:
1630 cm$^{-1}$ (νc=o, amide), 1720 cm$^{-1}$ (νc=o, ester)

0.4 mg of the copolymer obtained in this example and 98.2 mg of poly(methyl methacrylate) with the molecular weight of 14000 were dissolved in 1.9 ml of chloroform and a cast film was obtained in the similar manner as in Example 25. A contact angle of water was measured for the film thus obtained with the N-acetylethyleneimine chain content of 0.10% by weight in the similar manner as in Example 25. For the average value of the measurement each for 30 times, the contact angle was 72° on the air side, whereas the contact angle was 45° on the glasss side and it was found that the copolymer of the present invention had excellent surface activity.

EXAMPLE 26

Copolymerizing reaction was carried out in the same manner as in Example 23 except for using 0.176 g (0.05 mmol) of the acryl type macromonomer obtained in Example 9 and 0.417 g (4.00 mmol) of styrene and without adding the solvent. The reaction was completed in one hour and 0.480 g of a white solid copolymer (99% yield based on the charged amount) was obtained in the same treatment as in Example 23 except for pouring the chloroform solution into n-hexane to conduct purification by re-precipitation.

The result of the GPC analysis for the resultant copolymer showed a molecular weight distribution curve having one peak and the molecular weight (Mn) was 43,000.

$^1$H—NMR data (CDCl$_3$, δ value) were as follows:
0.8–2.7(br., CH$_2$C, 212H, br., CHC, 106H, br., CCH$_2$CH$_2$C,
108H, br., CH$_2$C=O, 54H, br., CH$_3$C, 81H, total 561H),
3.0(s., CH$_3$N,3H), 3.4(br.s., CH$_2$N,108H),
6.2–7.4(br., C$_6$H$_5$, 525H)

The ratio between CH$_2$N and C$_6$H$_5$ was determined based on the analytical values to calculate the copolymer composition ratio between the macromonomer and styrene, it was 1:80 (the charged ratio was 1:80).

IR spectral data were as follows: 1630 (νc=o, amide), 1720 (νc=o, ester)

EXAMPLE 27

Copolymerizing reaction was carried out in the same as in Example 23 except for using 0.354 g (0.10 mmol) of the acryl type macromonomer obtained in Example 9 and 0.403 g (4.02 mmol) of methyl methacrylate and increasing the amount of AIBN to 0.034 g (0.21 mmol). The reaction was completed in one hour and 0.545 g (72% yield based on the charged amount) of a white solid copolymer was obtained by the same treatment as in Example 23 except for conducting purification by re-precipitation using n-hexane.

The result of the GPC analysis for the resultant copolymer showed a molecular weight distribution curve having one peak and the molecular weight (Mn) was 20000.

$^1$H—NMR data (CDCl$_3$, δ value) were as follows:

0.8–2.5(br., CH$_3$C,201H, br., CCH$_2$C, 82H, br., CHC,1H, br., CCH$_2$CH$_2$C, 108H, br., CH$_2$C=O, 54H, total 446H), 3.0(s., CH$_3$N, 3H), 3.4(br.s., CH$_2$N, 104H), 3.6 (s., CH$_3$O, 120H)

When the ratio between CH$_2$N and CH$_3$O was determined from the analytical values to calculate the copolymer composition ratio between the macromonomer and methylmethacrylate, it was 1:42 (charging ratio was 1:40).

IR spectral were as follows: 1630 cm$^{-1}$ ($\nu$c=o, amide), 1720 ($\nu$c=o, ester).

EXAMPLE 28

Copolymerizing reaction was carried out in the same manner as in Example 23 except for using 0.170 g (0.05 mmol) of the acryl type macromonomer obtained in Example 10 and 0.273 g (2.62 mmol) of styrene, without using a solvent and using 0.024 g (0.15 mmol) of AIBN. The reaction was completed in one hour and 0.372 g (84% yield based on the charged amount) of a white solid copolymer was obtained by the same treatment as in Example 23 except for conducting purification by re-precipitation using n-hexane.

The result of the GPC analysis for the resultant copolymer showed a molecular weight distribution curve having one peak and the molecular weight (Mn) was 73,000.

$^1$H—NMR data (CDCl$_3$, $\delta$ value) were as below:

0.8–2.6(br., CH$_3$C, 81H, br., CH$_2$C, 92H, br., CCH$_2$CH$_2$C, 104H, br., CH$_2$C=O, 52H, Br., CHC, 1H, total 330H), 3.0 (s., CH$_3$N, 3H), 3.4(s., CH$_2$N, 104H), 6.2–7.2(br., C$_6$H$_5$, 225H)

When the ratio between CH$_2$N and C$_6$H$_5$ was determined from the analytical values to calculate the copolymer composition ratio between the macromonomer and styrene, it was 1:45 (charged ratio was 1:52).

IR spectral data were as follows:

1630 cm$^{-1}$ ($\nu$c=o, amide), 1720 ($\nu$c=o, ester).

EXAMPLE 29

Copolymerizing reaction was carried out in the same manner as in Example 23 except for using 0.377 g (0.11 mmol) of the acryl type macromonomer obtained in Example 10 and 0.765 g (7,64 mmol) of methyl metyacrylate, and adding 0.039 g (0.24 mmol) of AIBN. The reaction was completed in one hour and 1.027 g (90% yield based on the charged amount) of a white solid copolymer was obtained by the same treatment as in Example 23 except for conducting purification by re-precipitation using n-hexane.

The result of the GPC analysis for the resultant copolymer showed a molecular weight distribution curve having one peak and the molecular weight (Mn) was 15,000.

$^1$H—NMR data (CDCl$_3$, $\delta$ value) were as follows:

0.4–2.5(br., CH$_3$C, 291H, br., CH$_2$C, 142H, br., CCH$_2$CH$_2$C, 104H, br., CH$_2$C=O, 52H, Br., total 559H), 3.0 (s., CH$_3$N, 3H), 3.4(s., CH$_2$N, 104H), 3.6(s., CH$_3$O, 210H)

When the ratio between CH$_2$N and CH$_3$O was determined from the analytical values to calculate the copolymer composition ratio between the macromonomer and methylmethacrylate, it was 1:70 (charging ratio was 1:69).

IR spectral data were as follows:

1630 cm$^{-1}$ ($\nu$c=o, amide) 1720 ($\nu$c=o, ester).

EXAMPLE 30

Copolymerizing reaction was carried out in the same manner as in Example 23 except for using 0.216 g (0.10 mmol) of the acryl type macromonomer obtained in Example 6 and 0.432 g (4.15 mmol) of styrene, without using the solvent and using 0.034 g (0.20 mmol) of AIBN. The reaction was completed in one hour and 0.529 g (82% yield based on the charged amount) of a white solid copolymer was obtained by the same treatment as in Example 23 except for conducting purification by re-precipitation using n-hexane.

The result of GPC analysis for the resultant copolymer showed a molecular weight distribution curve having one peak and the molecular weight (Mn) was 30,000.

$^1$H—NMR data (CDCl$_3$, $\delta$ value) were as follows:

0.4–2.6(br., CH$_3$C, 60H, br., CH$_2$C, 82H, br., CHC, 41H, br., CH$_2$C=O, 40H, total 223H), 3.0 (s., CH$_3$N, 3H), 3.4(s., CH$_2$N, 80H), 6.1–7.2(br., C$_6$H$_5$, 225H)

When the ratio between CH$_2$N and C$_6$H$_5$ was determined from the analytical values to calculate the copolymer composition ratio between the macromonomer and styrene, it was 1:41 (charged ratio was 1:42).

IR spectral data were as follows:

1630 cm$^{-1}$ ($\nu$c=o, amide), 1720 ($\nu$c=o, ester).

EXAMPLE 31

Copolymerizing reaction was carried out in the same manner as in Example 23 for except for using 0.349 g (0.10 mmol) of the acryl type macromonomer obtained in Example 10 and 0.284 g (3.99 mmol) of acryl amide, adding 1.0 ml of acetonitrile instead of t-butyl alcohol and using 0.033 g (0.20 mmol) of AIBN.

The reaction was completed in one hour, and the product was washed with tetrahydrofuran and dried to obtain 0.438 g (70% yield based on the charged amount) of a white powdery copolymer.

The resultant copolymer was not completely dissolved in N,N-dimethylformamide or chloroform but formed a complete solution with dimethyl sulfoxide (DMSO). $^1$H—NMR was measured for the DMSO-d$_6$ solution of the polymer to confirm that it was a 1:40 copolymer of methacryl ester having poly-(N-n-butylcarbonylethyleneimine) chain and acryl amide, containing no unreacted monomer.

EXAMPLE 32

Copolymerizing reaction was carried out in the same manner as in Example 23 except for using 0.096 g (0.05 mmol) of the acryl type macromonomer obtained in Example 1 and 0.110 g (2.08 mmol) of acrylonitrile and without adding the solvent. The reaction was completed in one hour and the product was dried to obtain 0.20 g (97% yield based on the charged amount) of a solid copolymer having slight elasticity. $^1$H—NMR was measured for the DMSO-d$_6$ solution of the resultant copolymer to confirm that it was a 1:40 copolymer of acryl ester having poly-n-acetylethyleneimine chain and acrylonitrile, without containing unreacted monomer.

EXAMPLE 33

Copolymerizing reaction was carried out in the same manner as Example 23 except for using 0.124 g (0.12 mmol) of the acrylamide type macromonomer obtained in Example 15 and 0.146 g (1.46 mmol) of methyl methacrylate and using 1.0 ml of acetonitrile instead of t-butyl alcohol as the solvent. The reaction was completed in one hour and it was confirmed that all of the vinyl groups in the system were disappeared based on the $^1$H—NMR data measured just after the reaction. The product was treated in the similar manner as in Example 23 to obtain 0.220 g (81% yield based on the charged amount) of a white solid copolymer.

As previously described in detail, an acryl type macromonomer according to the present invention has the following particular advantages.

The acryl type of macromonomer having the polyethyleneimine derivative chain according to the present invention is the acryl or α-substituted acryl type monomer having polymerizable active functional group at the terminal end, which is useful for synthesizing novel polymers by copolymerization with various monomers or graft polymerization to various polymers, and novel graft polymers produced by using such novel macromonomers have special surface activity, for which various application uses can be expected.

What is claimed is:

1. An acryl macromonomer having a polyethyleneimine derivative chain represented by the general formula:

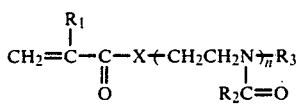  (1)

where $R_1$ represents H or $CH_3$, $R_2$ represents H or (substituted) alkyl or aryl group, $R_3$ represents H or (substituted) alkyl group, X represents O or $NR_4$, $R_4$ represents H or alkyl or aryl group and n represents a number from 4.9 to 1000.

2. A process for producing an acryl macromonomer having a polyethyleneimine derivative chain represented by the general formula:

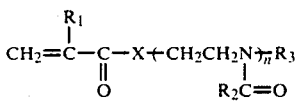  (1)

where $R_1$ represents H or $CH_3$, $R_2$ represents H or (substituted) alkyl or aryl group, $R_3$ represents H or (substituted) alkyl group, X represents O or $NR_4$, $R_4$ represents H or alkyl or aryl group and n represents a number from 4.9 to 1000, wherein a compound represented by the general formula:

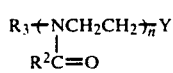  (2)

where $R_2$ represents H or (substituted) alkyl or aryl group, $R_3$ represents H or (substituted) alkyl group, Y represents OH or $NHR_4$, $R_4$ represents H or alkyl or aryl group, n represents a number from 4.9 to 1000, is reacted with (meth)acrylic acid or the derivative thereof under the presense of a base.

3. A process for producing an acryl macromonomer having a polyethyleneimine derivative chain represented by the general formula:

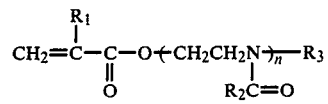  (1)

where $R_1$ represents H or $CH_3$, $R_2$ represents H or (substituted) alkyl or aryl group, $R_3$ represents H or (substituted) alkyl group, and n represents a number from 4.9 to 1000, wherein a 2-oxazoline type compound represented by the general formula:

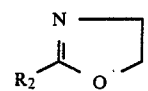  (3)

where $R_2$ represents H or (substituted) alkyl or aryl group, is subjected to living polymerization by using a cationic polymerization initiator and then the living growing end thereof is reacted with a (meth)acryl acid salt or (meth)acryl acid ester.

4. A graft polymer having, as a graft chain, a polyethylene imine derivative chain represented by the general formula:

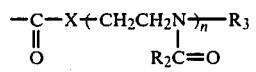  (4)

where $R_2$ represents H or (substituted) alkyl or aryl group, $R_3$ represents H or (substituted) alkyl group, X represents O or $NR_4$, $R_4$ represents H or alkyl or aryl group and n represents a number of from 4.9 to 1000.

5. A process for preparing a graft polymer having a polyethylene imine derivative chain comprising:
(a) preparing an acryl macromonomer according to formula (1)

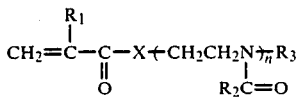  (1)

wherein $R_1$ represents H or $CH_3$, $R_2$ represents H, (substituted) alkyl or aryl, $R_3$ represents H or (substituted) alkyl, X represents O or $NR_4$, $R_4$ represents H, alkyl or aryl, and n represents a number from 4.9 to 1000 by reacting a compound according to formula (2):

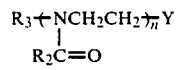

wherein $R_2$, $R_3$, $R_4$ and n are as defined above, and Y represents OH or $NHR_4$,
with a compound selected from the group consisting of (meth)acrylic acid, a (meth)acrylic acid halide, a (meth)acrylic acid ester and a (meth)acrylic acid anhydride,
in the presence of a nitrogen-containing base; and
(b) reacting said macromonomers according to formula (1) with an unsaturated monomer selected from the group consisting of styrenic compounds, (meth)acrylic acid derivatives, ethylenically unsaturated monoolefins, vinyl halides, vinyl esters, vinyl ethers, vinyl ketones, heteroatom-containing vinyl compounds wherein said heteroatom is selected from the group consisting of N, S and P, in a solvent and in the presence of an initiator selected from the group consisting of free radical polymerization initiators, anionic polymerization initiators, light or radioactive rays.

* * * * *